United States Patent
Volpenheim et al.

(10) Patent No.: US 6,675,845 B2
(45) Date of Patent: Jan. 13, 2004

(54) PACKAGE AND METHOD FOR CONTROLLED METERED DOSE DISPENSING OF A FLUID PRODUCT

(75) Inventors: Daniel William Volpenheim, Mason, OH (US); Christopher Miles Miller, Milford, OH (US); Christopher Lawrence Smith, Liberty Township, OH (US); William Michael Cannon, Cincinnati, OH (US); Robert Edward Stahley, Middletown, OH (US); Phillip Cordell Myles, Harrison, OH (US); Frederick James Rohman, Loveland, OH (US); Chow-chi Huang, West Chester, OH (US); Todd Mitchell Day, Bethel, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/161,395

(22) Filed: Jun. 3, 2002

(65) Prior Publication Data

US 2002/0179179 A1 Dec. 5, 2002

Related U.S. Application Data

(60) Provisional application No. 60/296,086, filed on Jun. 5, 2001.

(51) Int. Cl.[7] ............................................. B65B 1/04
(52) U.S. Cl. ....................... 141/380; 141/381; 222/207
(58) Field of Search ............................. 141/380, 381; 222/1, 207, 425, 434, 446, 445, 438, 448, 449, 450, 153.14, 144.5

(56) References Cited

U.S. PATENT DOCUMENTS

| | | | | |
|---|---|---|---|---|
| 1,283,050 A | * | 10/1918 | Berg | 222/207 |
| 2,038,418 A | * | 4/1936 | Conner | 222/446 |
| 3,125,250 A | * | 3/1964 | Ballin | 222/96 |
| 3,734,350 A | * | 5/1973 | Waterman et al. | 222/92 |
| 3,828,985 A | * | 8/1974 | Schindler | 222/207 |
| 3,844,454 A | * | 10/1974 | Buchtel | 222/453 |
| 4,143,794 A | * | 3/1979 | Stratford et al. | 222/207 |
| 4,143,797 A | | 3/1979 | Reed | |
| 4,376,495 A | | 3/1983 | Spatz | |
| 4,582,230 A | | 4/1986 | Vierkotter | |
| 4,607,762 A | | 8/1986 | Zulauf et al. | |
| 4,776,494 A | | 10/1988 | Holoubek | |

(List continued on next page.)

Primary Examiner—Gregory Huson
Assistant Examiner—Khoa Huynh
(74) Attorney, Agent, or Firm—Emelyn L. Hiland

(57) ABSTRACT

A method and package for controlled metered dispensing of a fluid product contained in the package having a metered dispensing system, each time the package is opened or uncapped are disclosed. By the present method and package, the maximum amount of product that can be dispensed is limited to a single metered dose after each uncapping of the package. Specifically, the metered dispensing system is configured to allow dispensing of only a single metered dose of a liquid, viscous liquid, gel, paste, or semi-solid product contained in the package and to prevent further dispensing of additional doses of product until at least one specific and deliberate step is taken that re-activates or re-engages the dispensing system. Such deliberate step is preferably one that occurs through natural use of the package, such as re-capping the open package after one single dose has been dispensed. Only after the open package has been re-capped can the next dose of product be available for dispensing. Thus, the system provides child resistance by preventing a child or other person who does not have the mental capacity to comprehend the threat of serious injury from contact with or improper use of the product, from gaining access to more than a single dose of the product each time the package is uncapped.

6 Claims, 20 Drawing Sheets

U.S. PATENT DOCUMENTS

| | | | |
|---|---|---|---|
| 4,886,193 A | * 12/1989 | Wassilieff | 222/446 |
| 5,031,802 A | * 7/1991 | Joulia | 222/207 |
| 5,078,305 A | 1/1992 | Glynn et al. | |
| 5,127,553 A | 7/1992 | Weinstein | |
| 5,184,760 A | * 2/1993 | Weinstein et al. | 222/207 |
| 5,746,349 A | 5/1998 | Putteman et al. | |
| 5,865,330 A | * 2/1999 | Buono | 215/216 |
| 5,897,029 A | 4/1999 | Tong | |
| 5,967,377 A | * 10/1999 | Glynn | 222/207 |
| 6,330,960 B1 | * 12/2001 | Faughey et al. | 222/207 |

\* cited by examiner

PACKAGE AND METHOD FOR CONTROLLED METERED DOSE DISPENSING OF A FLUID PRODUCT

CROSS REFERENCE

This application claims priority under Title 35, United States Code 119(e) from Provisional Application Ser. No. 60/296,086, filed Jun. 5, 2001.

FIELD OF THE INVENTION

The present invention relates to a method and package for controlled metered dispensing of a fluid product contained in the package.

BACKGROUND OF THE INVENTION

Child resistant packaging is understood to be an important concept for preventing inadvertent access by children, for example, to potentially dangerous liquid or dry products. However, inclusion of the child resistant feature adds difficulty and frustration for the adult user when attempting to open the package. Due to the difficulty in opening child resistant packages, many persons, especially elderly adults who may also have impaired strength and dexterity, could prefer a non-child resistant package substitute. Alternatively, even when consumers purchase products in child resistant packages, the child resistant package may not be re-closed or re-capped in order to defeat the child resistant feature. As a result of packages being left uncapped and having easy access to their contents, the danger of child poisonings and other product misuse may increase.

Examples of such potentially dangerous products are liquid or other fluid medicines from a bottle, which normally require that the administered amount be measured so as to agree with the prescribed amount to be effective. Well known measures are teaspoonfuls, tablespoonfuls, capfuls, drops and milliliters, all of which are simply poured or otherwise dispensed from the medicine bottle. Usually, however, nothing prevents the entire contents of the bottle from being poured out and ingested, e.g., by children or other persons who may not have the mental capacity to comprehend the threat of serious injury from contact with or improper use of such medicines. This problem is not limited to medicines, but also occurs with household chemicals, and the like, packaged in bottles, tubes, cans and similar containers.

A number of packages have been developed which allow a measured dose of product, particularly medicines, to be dispensed from a container. Most of these are particularly designed to yield very accurate doses, which can be selected and adjusted by the user. However, there has been less attention paid to safety, such that the packages can either be opened easily or do not have the means to control inadvertent access to their contents. Where due safety measures are provided, the resulting package is often complicated, expensive and difficult to operate.

The aforementioned problems are generally recognized in the packaging industry and various means have been suggested to overcome them. See for example, U.S. Pat. No. 4,776,494, issued to Holoubek on Oct. 11, 1988; commonly assigned U.S. Pat. No. 4,143,797, issued to Reed on Mar. 13, 1979; U.S. Pat. No. 5,127,553, issued to Weinstein on Jul. 7, 1992; U.S. Pat. No. 4,582,230, issued to Vierkotter on Apr. 15, 1986; and U.S. Pat. No. 4,607,762, issued to Zulauf and Griesheim on Aug. 26, 1986. Each of the aforementioned patents discloses metered dosing capabilities. Still other disclosures relating to metered dosing capabilities include U.S. Pat. No. 4,376,495, issued to Spatz on Mar. 15, 1983; U.S. Pat. No. 5,078,305, issued to Glynn and Goldstein on Jan. 7, 1992; U.S. Pat. No. 5,746,349, issued to Putteman et al. on May 5, 1998; and U.S. Pat. No. 5,897,029 issued to Tong on Apr. 27, 1999. The Tong patent discloses a dispenser particularly suited for toothpaste tubes, wherein a fixed amount of paste flows out of the dispensing spout for each dispensing squeeze of the tube.

Even with the substantial body of work in this area, there continues to be a long-felt need for simple and easy-to-handle packages that allow only a single accurate dose of product, such as medicines and other potentially dangerous products, to be dispensed from a container each time the container is opened.

The present invention provides a method and package, which inhibit inadvertent access to dangerous quantities of potentially dangerous products such as medicines or other household chemicals by requiring the user to repeat one or more deliberate steps before such a dangerous quantity can be extracted from the container. (By "dangerous quantity" is meant an amount greater than a single predetermined dose.)

SUMMARY OF THE INVENTION

The present invention provides a method for controlled dispensing of a fluid product contained in a package having a metered dispensing system, to a maximum amount of a single metered dose each time the package is uncapped, said method comprising taking one or more requisite steps in order to activate said dispensing system to deliver a next dose, said requisite steps including re-capping said package after dispensing said single metered dose. The present invention further provides a package having a dispensing system for controlled metered dose dispensing of a fluid product, comprising (a) a container having a body for holding a fluid product and a discharge opening for dispensing said fluid product;

(b) a closure fitted for capping said container and sealing said discharge opening;

(c) a dose chamber in communication with said discharge opening, said dose chamber being capable of metering a predetermined amount of fluid product that can be dispensed from the container after each removal of said closure and having an inlet through which fluid product in said container body can flow into said dose chamber;

(d) a flow control member for regulating the flow of fluid product between said container body and said dose chamber; and (e) an actuator for triggering product flow from the container body into the dose chamber to provide a metered dose ready for dispensing, said actuator being associated with or cooperating with said closure.

In use, the package is re-capped after dispensing one metered dose in order to activate the dispensing system to deliver a next metered dose of product.

These and other features, aspects, and advantages of the present invention will become evident to those skilled in the art from the following detailed description.

DETAILED DESCRIPTION OF THE INVENTION

Figure 1A:
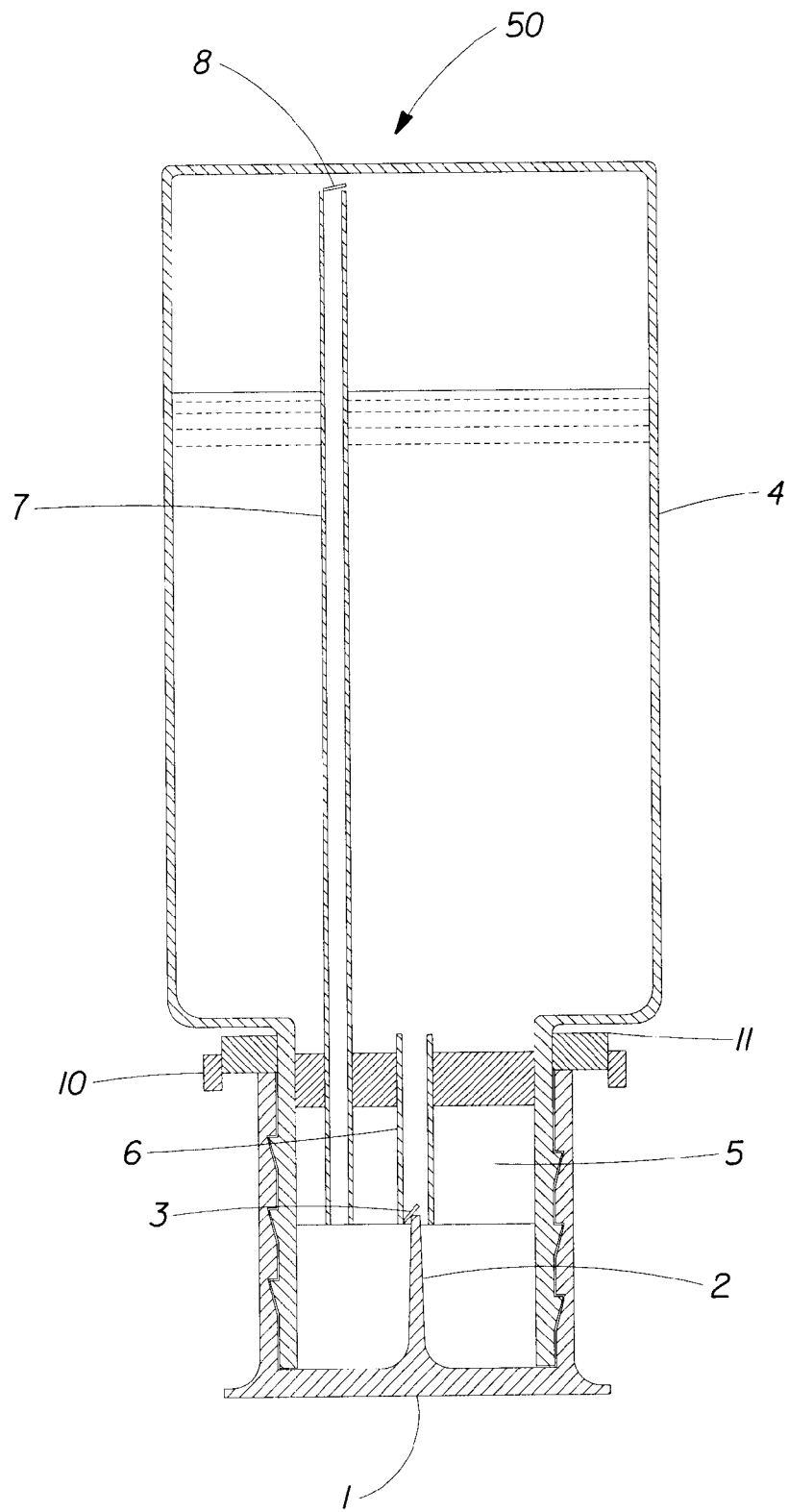
FIGS. 1A and 1B illustrate a child resistant package with controlled metered dose dispensing particularly for a liquid product according to the present invention.

While the specification concludes with claims, which particularly point out and distinctly claim the invention, it is believed the present invention will be better understood from the following detailed description.

All documents cited are, in relevant part, incorporated herein by reference; the citation of any document is not to be construed as an admission that it is prior art with respect to the present invention.

Herein, "comprising" means that other components and other steps which do not affect the end result can be added. This term encompasses the terms "consisting of" and "consisting essentially of".

The present invention provides a method for controlled metered dispensing of a fluid product contained in a package having a metered dispensing system, each time the package is opened or uncapped. By the present method and package, the maximum amount of product that can be dispensed is limited to a single metered dose after each uncapping of the package. Specifically, the metered dispensing system is configured to allow dispensing of only a single metered dose of a liquid, viscous liquid, gel, paste, or semi-solid product contained in the package and to prevent further dispensing of additional doses of product until at least one specific and deliberate step is taken to activate or re-engage the dispensing system. Such deliberate step is preferably one that occurs through natural use of the package, such as recapping the open package after a single dose has been dispensed. Only after the open package has been recapped can the next dose of product be available for dispensing. Thus, the system provides child resistance by preventing a child or other person who does not have the mental capacity to comprehend the threat of serious injury from contact with or improper use of the product from gaining access to more than a single dose of the product each time the package is uncapped. It would be counter-intuitive to recap or re-close an open package in order to dispense more product. Thus, the potential for inadvertent overdosing and poisoning can be significantly reduced. The controlled dispensing feature provides delivery of an accurate amount of product for the intended application, while also avoiding waste, spillage, and mess. With conventional packages, excess product that is dispensed often has to be discarded and thus, wasted, as it is practically impossible and also unsanitary to return the excess product into the package. Preferably, the present dispensing system includes an additional child resistance feature, which makes it difficult for children or mentally challenged persons to uncap or open the package in the first instance.

The package according to the present invention is suitable for storing and dispensing potentially dangerous products in particular. Potentially dangerous products are products, which may be harmful to children and even adults when not used in a conscious manner or with the correct dosage. Medicines, cleaning products such as laundry and dishwashing detergents, cleansers and spray cleaners, health and personal care products such as ointments, cosmetics, shampoos, topical creams, lotions, eye drops, dentifrices and mouthwashes, and other household chemicals such as fabric conditioners, bleaches, polishes, lawn, garden and automotive chemicals are examples of such products, particularly those in fluid form including liquids, gels, pastes and other semi-solids. The present package is also useful for storing and dispensing food and beverage products that are measured for optimum results, such as drink mixes, oils, condiments, extracts, flavorings and sauces. While these edible products may not necessarily pose a threat when dispensed in excess, the present package is advantageous in providing convenient dispensing of measured amounts for e.g., recipes and seasoning or flavoring, and in preventing waste and spills, particularly if the package is inadvertently left uncapped.

The present package for controlled metered dispensing of a fluid product comprises a container such as a bottle, tube, can, or the like, having a body for holding said fluid product and a discharge opening for dispensing said fluid product; a closure, such as a cap, which is preferably child resistant, fitted for capping the container and sealing the discharge opening; a dose chamber in communication with the discharge opening, the dose chamber capable of metering a predetermined amount of fluid product that can be dispensed from the container after each removal of the closure and having an inlet member through which fluid product held in the container body can flow into the dose chamber; a flow control member or valve for regulating the flow of fluid product between the container body and the dose chamber; and an actuator for triggering product flow from the container body into the dose chamber to provide a metered dose ready for dispensing, the actuator being associated with or cooperating with the closure. In one aspect, the actuator is configured such that capping the container with the closure results in opening a valve to allow fluid product from the container body into the dose chamber and uncapping the container allows the valve to close such that additional product held in the container body is prevented from flowing into the dose chamber. Thus, essentially only product contained in the dose chamber can be dispensed after the container is uncapped and only after the package is recapped can the valve be opened to allow the dose chamber to be refilled with a next dose of product.

The following examples further describe and illustrate embodiments within the scope of the present invention.

These examples are given solely for the purpose of illustration and are not to be construed as limitations of the present invention as many variations thereof are possible without departing from the spirit and scope.

Figure 1B:
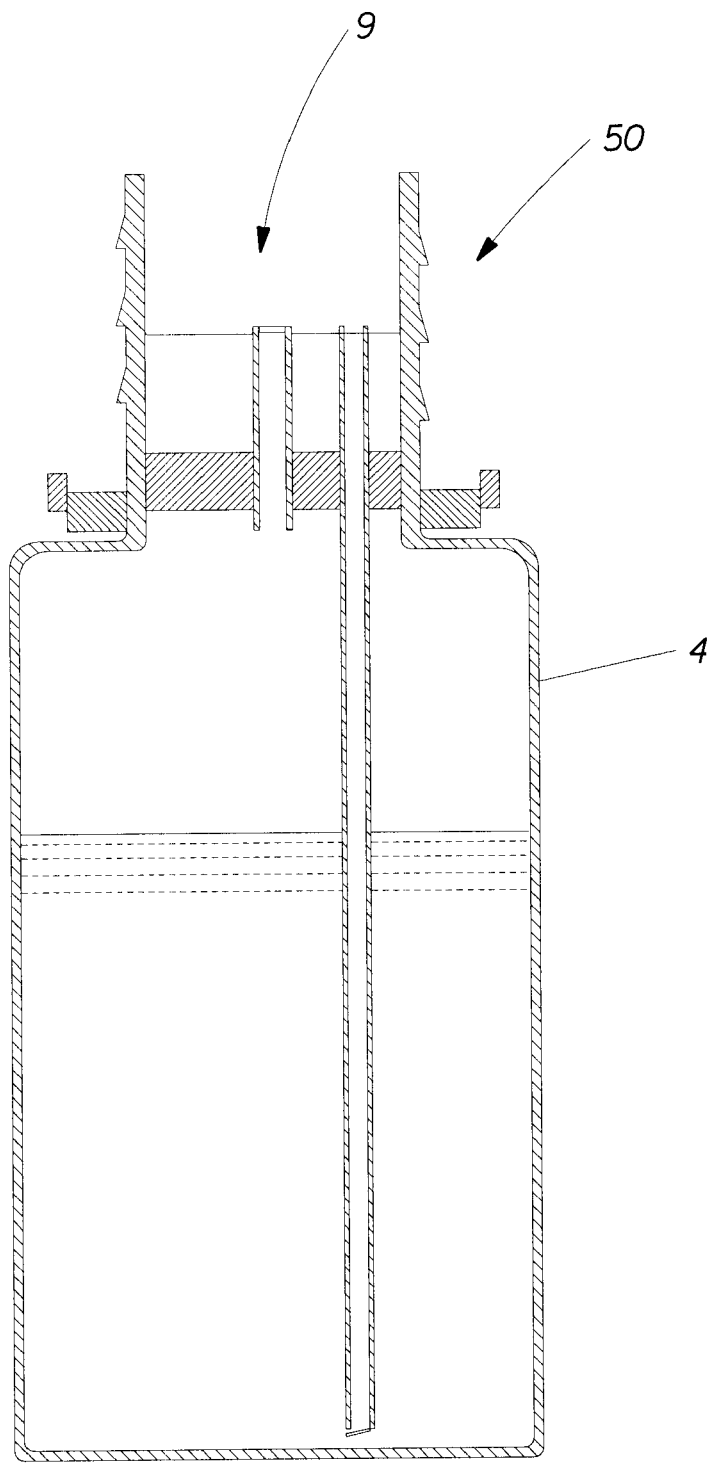

FIGS. 1A and 1B show an example of a child resistant package according to the present invention with controlled metered dose dispensing particularly for a is liquid product. The package (50) comprises a container body (4) having a discharge opening (9), a child resistant closure (1), and a dispensing assembly in the neck portion of the container body. The dispensing assembly includes a dose chamber (5), a fill tube (6), a one-way flapper valve (3), and a vent tube or venting means (7) with a check valve (8). Instead of separate fill and vent tubes, a single tube can be configured to function both as a fill and vent tube. When a separate vent tube is used as shown, check valve (8) is present to prevent product flow through vent tube (7) itself. The child resistant feature includes release tab(s) (10), a locking ring (11), and an actuating return rod (2) being centrally disposed inside closure (1) and projecting inwardly from the end wall of the closure and adapted to hold open one-way valve (3) when the container is in a capped or closed configuration.

The package shown in FIG. 1A is ideally stored in an inverted position with closure (1) down. In this capped and inverted position, return rod (2), which may be part of or a separate piece inserted into the closure, makes contact with one-way valve (3) and pushes it into an open position. As a result, product can freely move through fill tube (6) filling dose chamber (5) with product. This process of dosing is invisible to the user and occurs automatically when the capped package is placed inverted on a counter top or other suitable surface. While product flows into the dose chamber, air is vented via vent tube (7) back into the available head (air) space inside the container. Product flow into the dose chamber is regulated by the distance of the vent tube from the inside of the closure. Once product contacts the top of the vent tube, air can no longer be displaced and the filling process ends. To dispense product from the package, the user turns the package upright and uncaps the container, allowing the valve to close, thus preventing additional product from flowing into the dose chamber. (FIG. 1B shows the uncapped package in upright position.) The unit dose, i.e., product contained in dose chamber (5), can then be dispensed, e.g., by pouring. After the product contained in dose chamber (5) has been dispensed, there is no more product available to be dispensed. In order to have more product available for dispensing, the package has to be recapped with closure (1) and the child resistant feature engaged, thereby holding one-way valve (3) open by return rod (2) and allowing product to flow into the dose chamber when the package is brought in an inverted position.

In the case of a squeezable container body, applying pressure on the container by squeezing will simply force product against the fill tube valve thereby closing the valve and preventing product from flowing into the dose chamber.

Figure 1C:
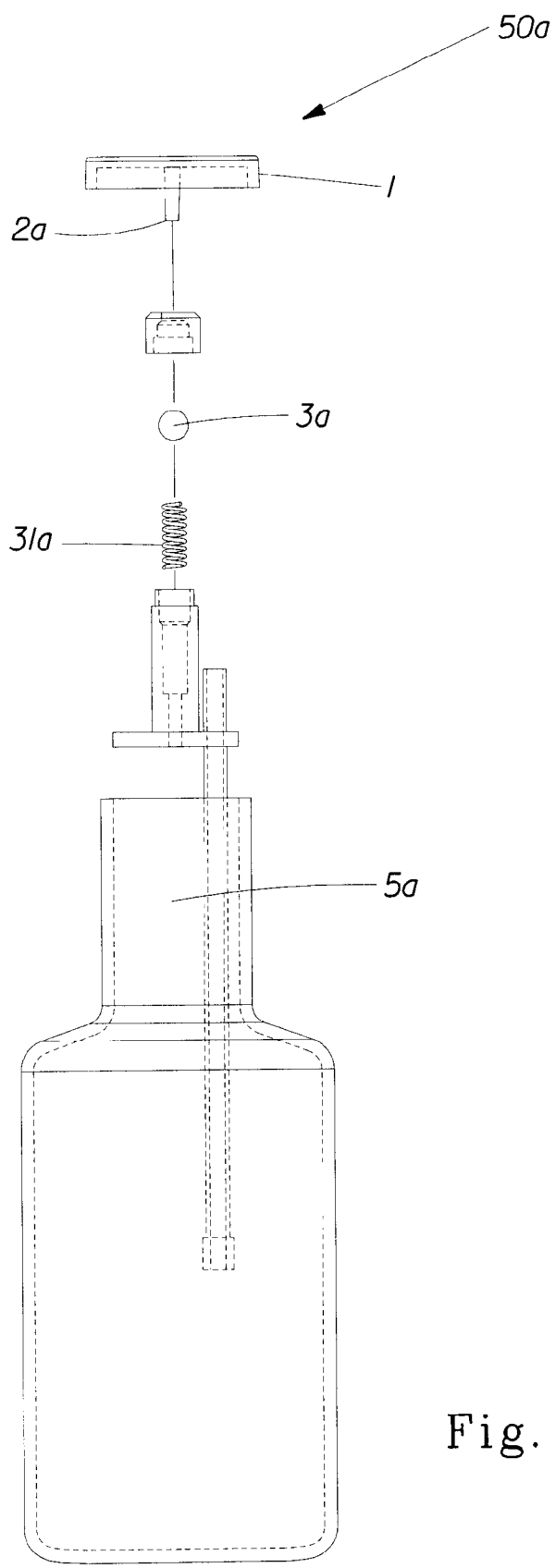
FIG. 1C illustrates in exploded view a package according to the present invention with controlled metered dose dispensing particularly for a liquid product using a ball and spring valve.

Another example of a valve system that may be used in the present dispensing system is a ball valve (3a) and spring (31a) shown in FIG. 1C in exploded view. When the container is in a capped position, the return rod (2a) pushes the ball valve (3a) open, allowing product to fill dose chamber (5a). When the container is uncapped, ball valve (3a) closes, thus, preventing additional product from flowing into the dose chamber. As in the previous example, no additional product can be dispensed until closure (1a) is replaced, whereby ball valve (3a) is held open by return rod (2a), to allow product to flow into the dose chamber when the package is brought in an inverted position.

The containers for use in accordance with the present invention may be made of any suitable material for holding fluid product, such as glass, metal or plastic. Preferably, the container is made of any thermoplastic material by injection and/or blow molding. Suitable thermoplastic materials have been extensively described in the art and include vinyl chloride based resins, polymers and co-polymers derived from olefins, acrylic polymers and co-polymers, polyethylene, polypropylene, polystyrene, polyethylene terephthalate, polyethylene terephthalate glycol, or mixtures thereof. The container can be made of single or multi-layer extrusion of such materials. It can also comprise recycled thermoplastic materials. A preferred thermoplastic material used herein for said container is polypropylene or polyethylene.

An example of a child resistant closure useful in the present invention is described in U.S. Pat. No. 4,948,002 issued to Thornock et al. on Aug. 14, 1990. The package comprises a container such as a bottle; a collar, which is secured in place over the uppermost portion of the container and a closure, which is secured to the finish portion of the container. The collar preferably includes a pair of spring-like pushtabs containing vertical extensions, which engage interlocking teeth on the innermost surface of the closure skirt when the closure is fully assembled onto the container. To remove the closure, the opposed pushtabs must be manually depressed prior to applying unscrewing torque to the closure to disengage the pushtab extensions from the interlocking teeth on the closure.

The package disclosed in '002 exhibits highly improved child resistance without significantly impeding access by adults. This has been further improved in WO 92/07286, in which a package is described whose child resistance is enhanced even further without making the package more difficult to open by adults. This is achieved, if the spring-like pushtabs containing vertical extensions are, at least to a degree, preloaded so as to exert a force against the innermost surface of the closure skirt once the closure has been fully assembled onto the package.

In both documents '002 and '286, the spring-like pushtabs containing vertical extensions are part of a transition piece attached to the container, like the collar of '002, or may be integral part of the container without any transition piece. Nonetheless, the user has to use both hands to overcome the child resistant feature and unscrew the closure.

Indeed, firstly one hand has to hold the container and at the same time depress the spring-like pushtabs. Secondly, the closure has to be unscrewed with the other hand. This means that both hands are needed to actually disengage said child resistant closure from the container, thus, the term "two hand operation".

The present invention also provides an alternative embodiment of a package comprising a child resistant closure, which can be readily opened by an adult with only one hand, such as described in U.S. Pat. No. 6,036,036 issued to Bilani et al. on Mar. 14, 2000. This is called a "one hand operation" closure, in contrast to the two-hand operation necessary for the closure described above. The package comprises a pushtab, which is placed on the closure and which together with an interlocking tooth, form the child-resistant feature of the package. Said pushtab located on said closure interlocks with the interlocking tooth when said closure is in its closed rest position. Therefore, an adult user may easily depress said pushtab and at the same time disengage said closure to open said package by using only one hand for both operations.

Figure 2A:
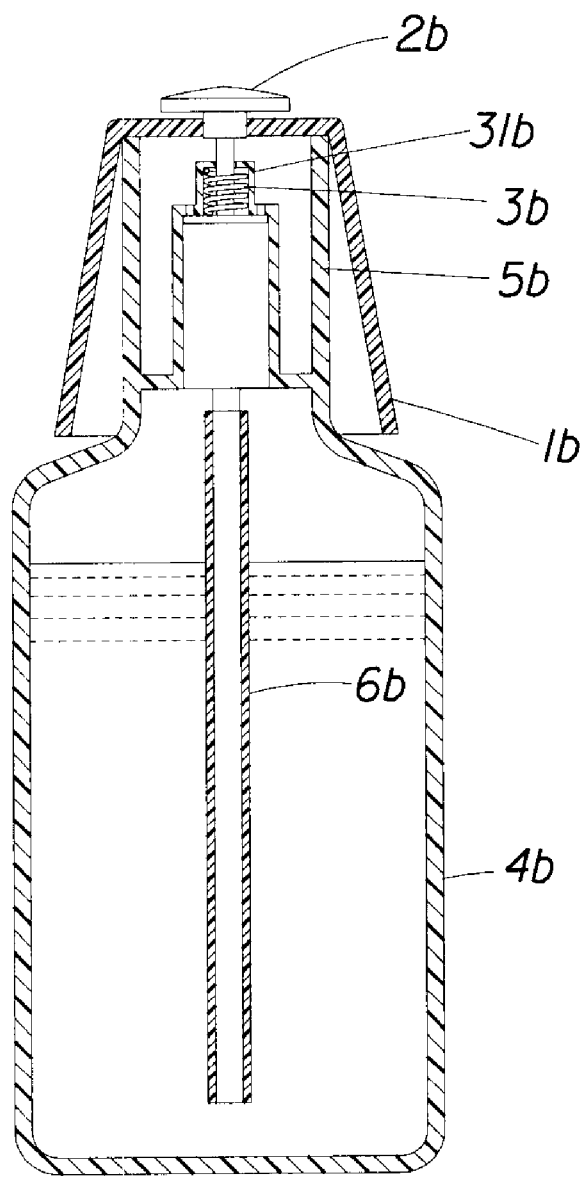
FIGS. 2A and 2B illustrate a squeezable dispensing container with a "push-button" feature according to the present invention.
Figure 2B:
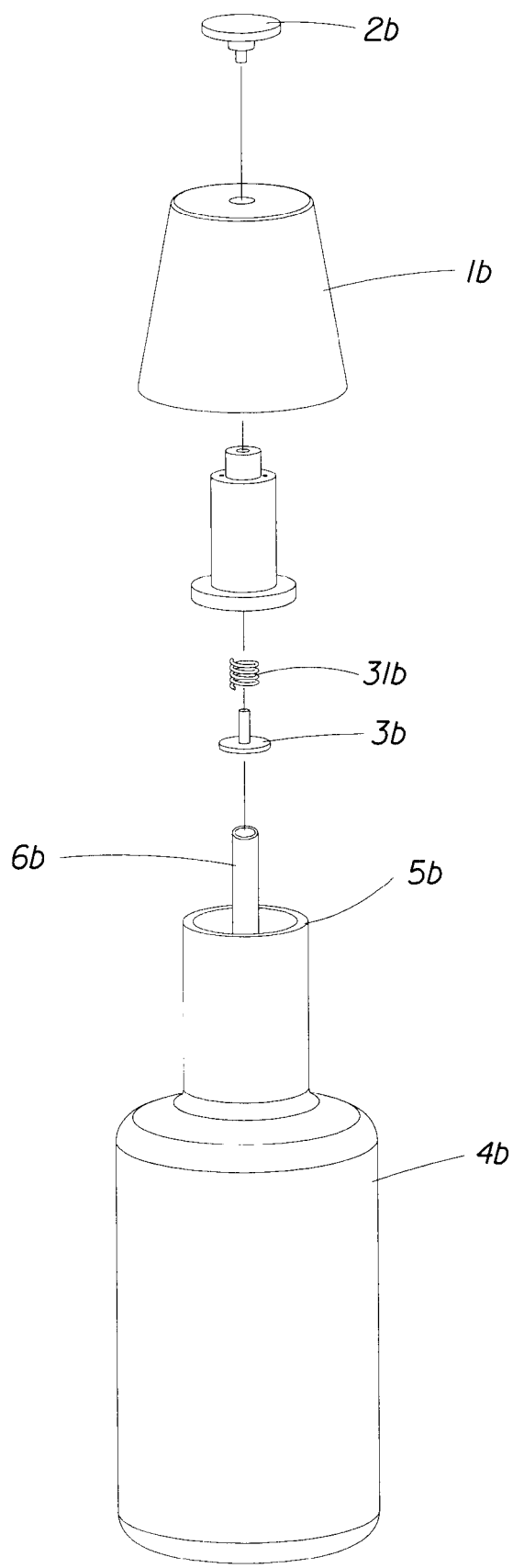

FIGS. 2A and 2B (exploded view) show another embodiment of the present invention being a squeezable dispensing container with an actuator such as a "push-button" for opening the valve. The package (50b) has a closure (1b) with a push-button actuator (2b) that opens a valve (3b) residing inside a dose chamber (5b) located in the neck portion of container body (4b). The container is preferably a squeezable bottle. A predetermined unit dose is set by the volume of the dose chamber. The valve (3b) resides within a valve assembly, which also includes a spring (31b), wherein the spring maintains pressure on the valve to remain in a closed position. In order to dose product, two actions must occur. Firstly, push-button (2b) is pushed downward firmly against the top of closure (1b). This action moves valve (3b) downward creating an open flow path through fill tube (6b) and into dose chamber (5b). This action also opens an air vent in closure (1b) so air can escape from the dose chamber while filling. Secondly, with valve (3b) open, the user squeezes container body (4b) and forces product through fill tube (6b) into dose chamber (5b). Preferably, both the closure and the container body are clear in order that the amount of product present in the dose chamber is visible. Once the dose chamber has the desired amount of product, the user then releases the push-button and discontinues squeezing the container body. At this point the natural tendency of the flexible container to resume its original shape and volume after being deformed by squeezing creates a vacuum which causes valve (3b) to open, once again opening fill tube (6b), such that any additional product beyond the unit dose is pulled back into the container. The product in dose chamber (5b) is now ready to be dispensed. The closure (1b), which is preferably child resistant, is removed and the product poured out. Only the product contained in the dose chamber (5b) will be dispensed since the valve automatically closes when the push button is released or the closure is removed.

Figure 3A:
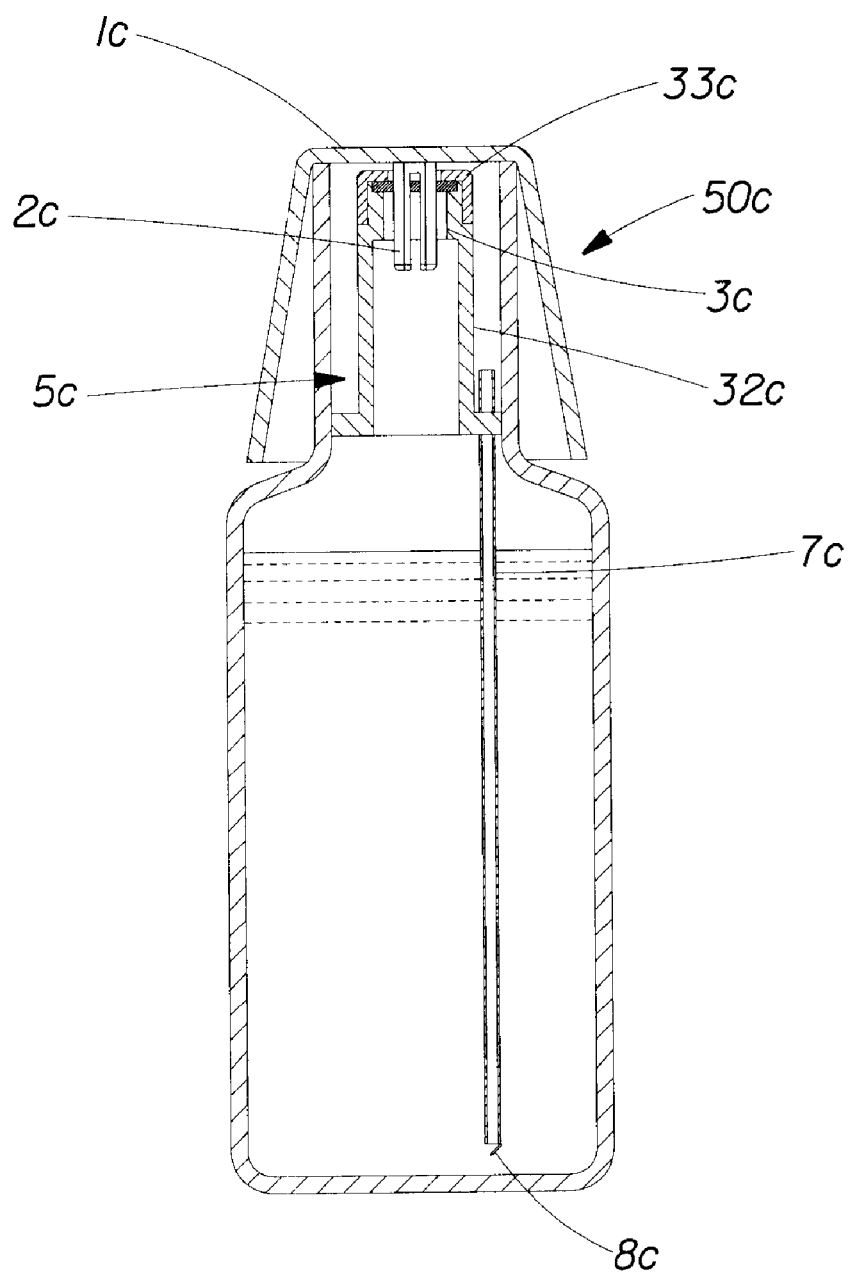
FIGS. 3A–3C illustrate a package with controlled metered dose dispensing suitable for either inverted or upright use, according to the present invention.
Figure 3B:
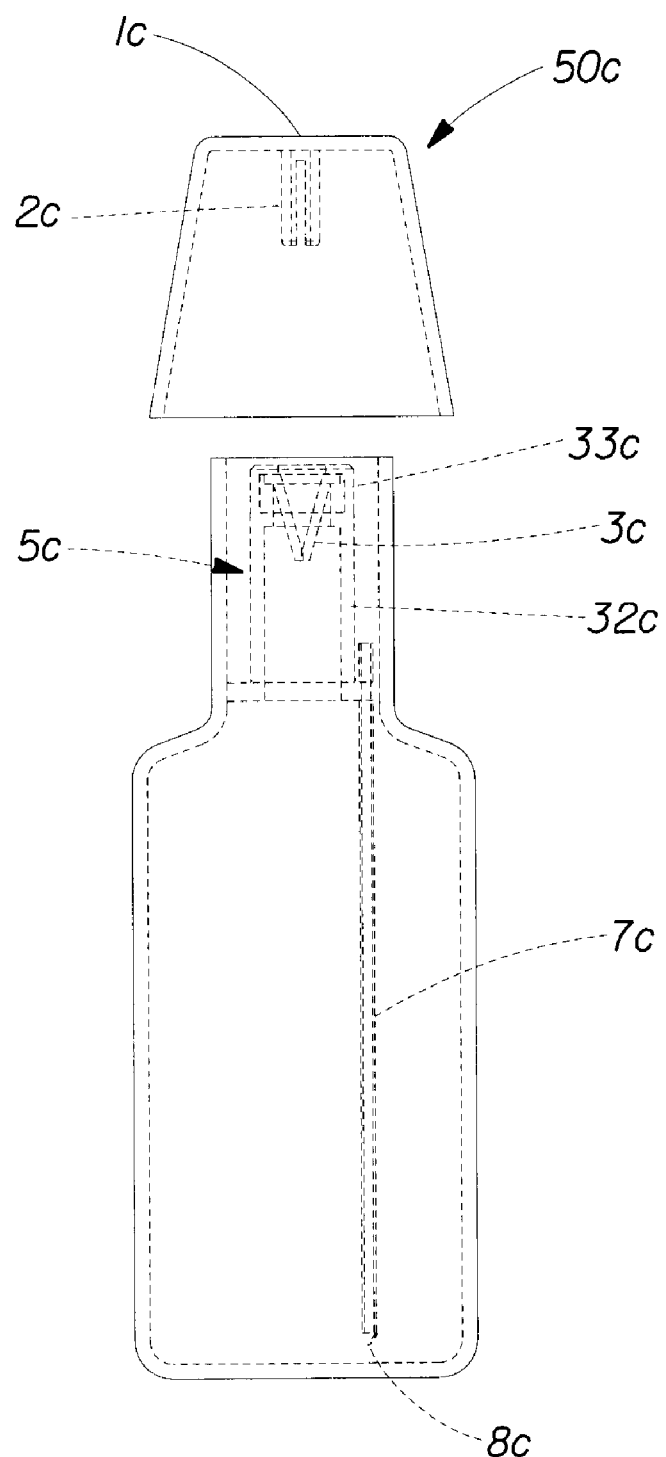
Figure 3C:
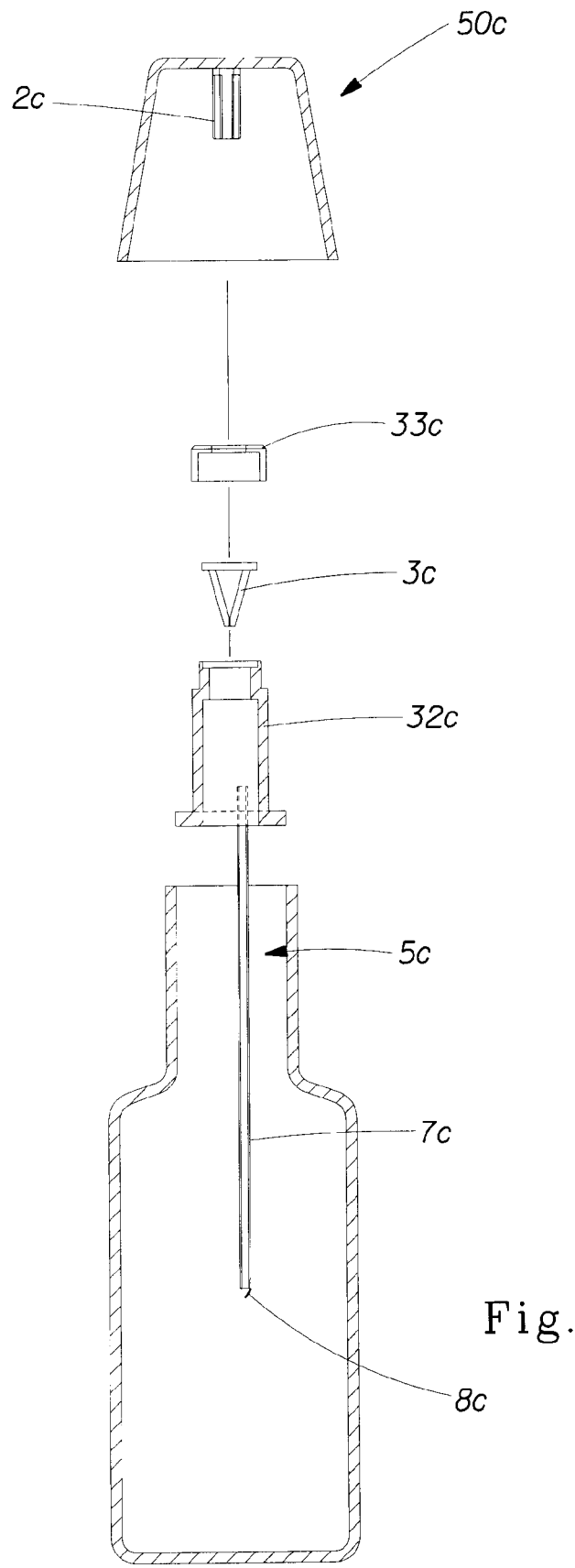

FIGS. 3A, 3B and 3C (exploded view) illustrate an embodiment of the present invention suitable for either inverted or upright use. The package (50c) has a closure (1c) with a slotted stem actuator (2c), which holds a one-way valve (3c) in an open position when the package is capped. The valve (3c) resides within a valve housing (32c) and is retained by a housing cap (33c). A vent tube (7c) is included. The slots in stem actuator (2c) extend above the top of the valve housing. When the package is capped, i.e., closure (1c) fully engaged and valve (3c) held open, this package may be placed inverted on a counter top or other suitable surface. When the package is in the inverted position, product fills dose chamber (5c), through the opening created by slotted stem actuator (2c). The filling process continues until product contacts the top of vent tube (7c). As in the embodiment shown in FIG. 1, air in dose chamber (5c) is displaced through vent tube (7c) into the head (air) space of the container. The vent tube (7c) has a check valve (8c) that prevents possible product access through the vent tube itself.

For an upright execution, the container must be squeezed to fill dose chamber (5c). This would require partially disengaging closure (1c) such as by rotating the closure approximately ¼ turn to open a vent, so that air can escape from dose chamber (5c) while filling. With the vent open, the container is squeezed until the dose chamber is filled to the desired level. A clear closure and container body would allow visual inspection of the amount of product contained in the dose chamber. With the dose chamber filled, squeeze pressure on the container body can be released and any excess product will be pulled back into the container.

Figure 4A:
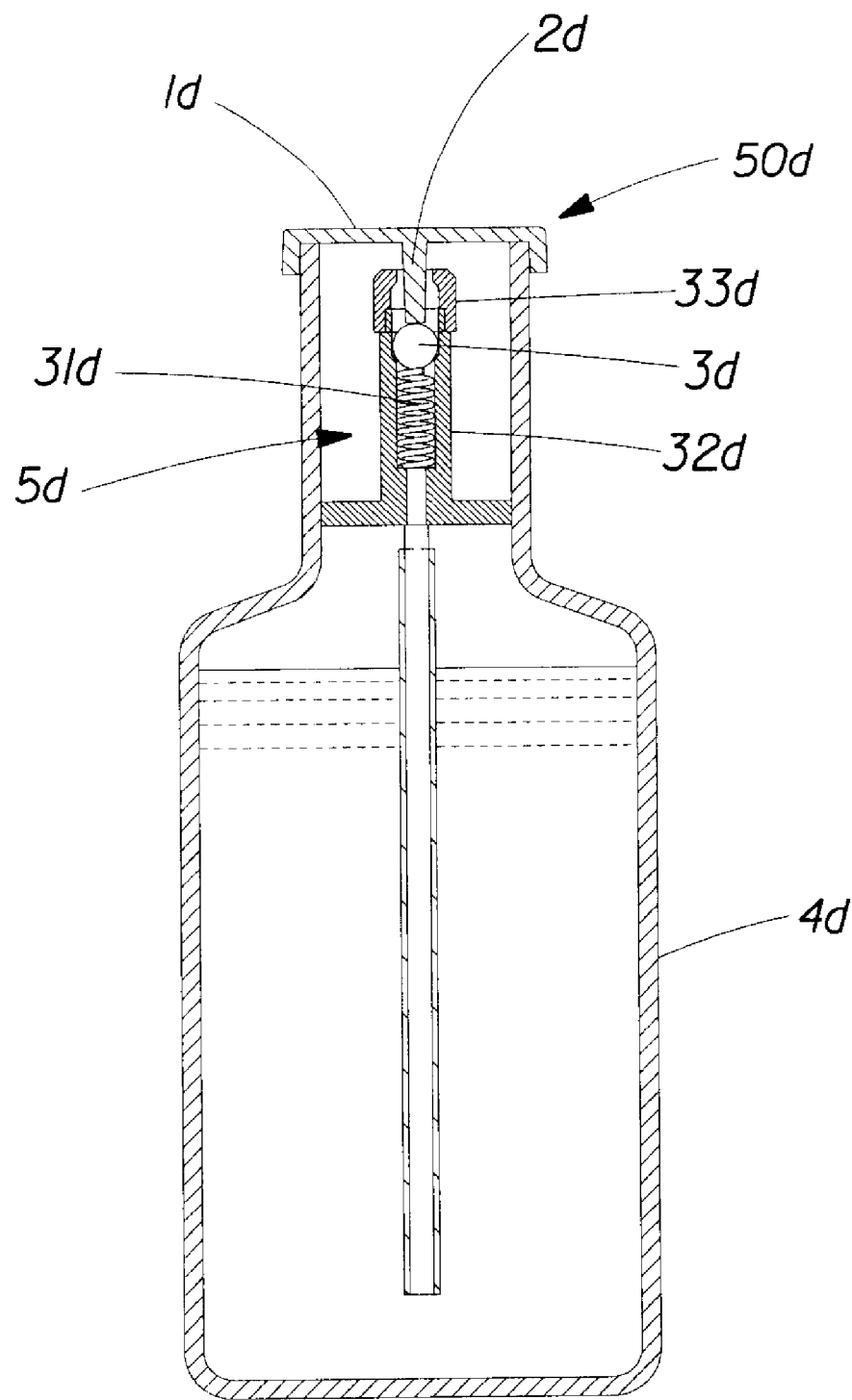
FIGS. 4A and 4B show another package according to the present invention having a cap configured to be rotated a predetermined amount in order to start the dosing process.
Figure 4B:
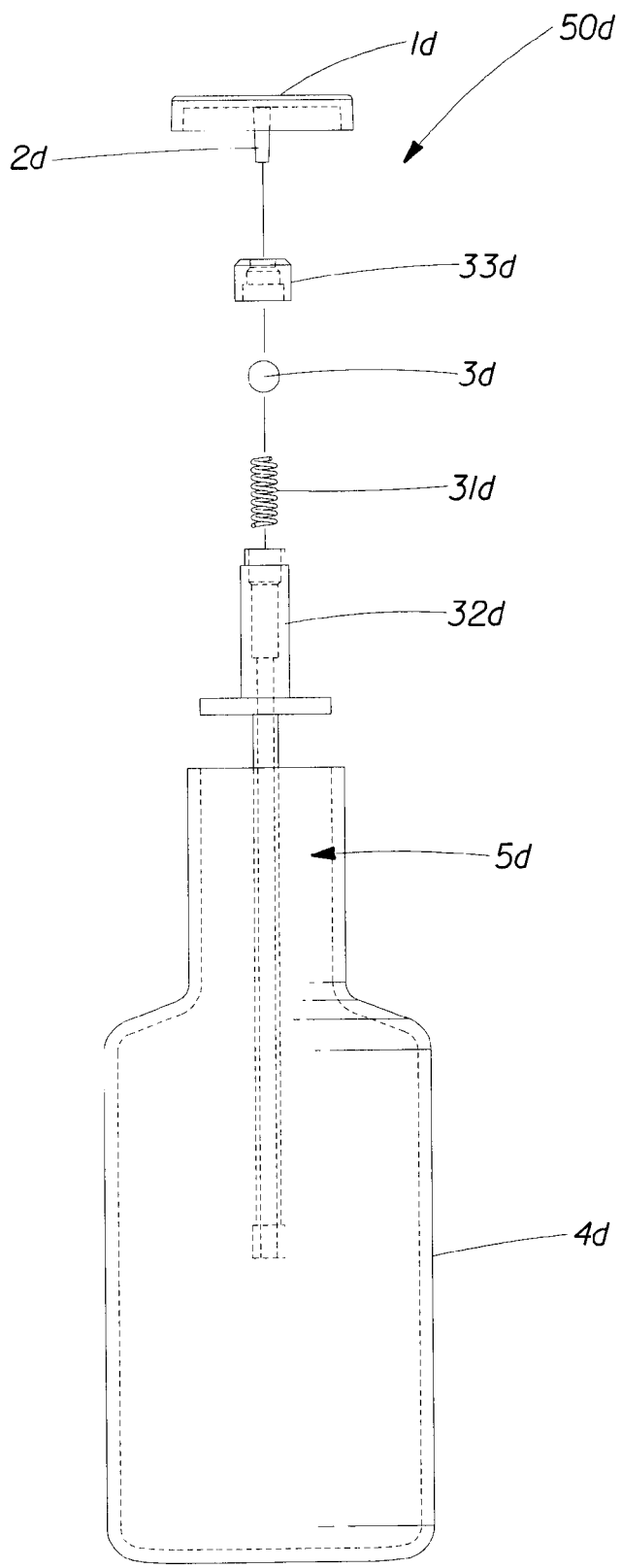

In another embodiment of the present invention illustrated in FIGS. 4A and 4B, the package (50d) has a closure (1d) configured to be rotated a predetermined amount to open a valve. The valve (3d) resides in a valve housing (32d), which also includes a spring (31d) and a housing cap (33d). Closure (1d) has a stem actuator (2d) that makes contact with valve (3d) and maintains said valve in a closed position when the container is fully capped. In this capped configuration, no product can flow into dose chamber (5d). To begin the dosing process, i.e. to fill dose chamber (5d) with product, closure (1d) first needs to be rotated a predetermined amount, for example, approximately ¼ turn. This allows venting so air in dose chamber (5d) can escape during the filling process. This also allows valve (3d) to open, creating a flow channel. With both the vent and the valve open, container body (4d) is squeezed such that product can flow through the open valve into the dose chamber. The container is preferably constructed from a clear material to allow the user to easily see the level of product filling the dose chamber. With dose chamber (5d) filled with the desired amount of product, the squeeze pressure can be released and any excess product will be pulled back into the bottle via open valve (3d). A predetermined dose is set by the volume of dose chamber (5d). To dispense product, closure (1d) is removed, allowing valve (3d) to close and thereby preventing further product flow into dose chamber (5d). After dispensing the product contained in the dose chamber, the package must be recapped in order to restart the dosing process.

Figure 5A:
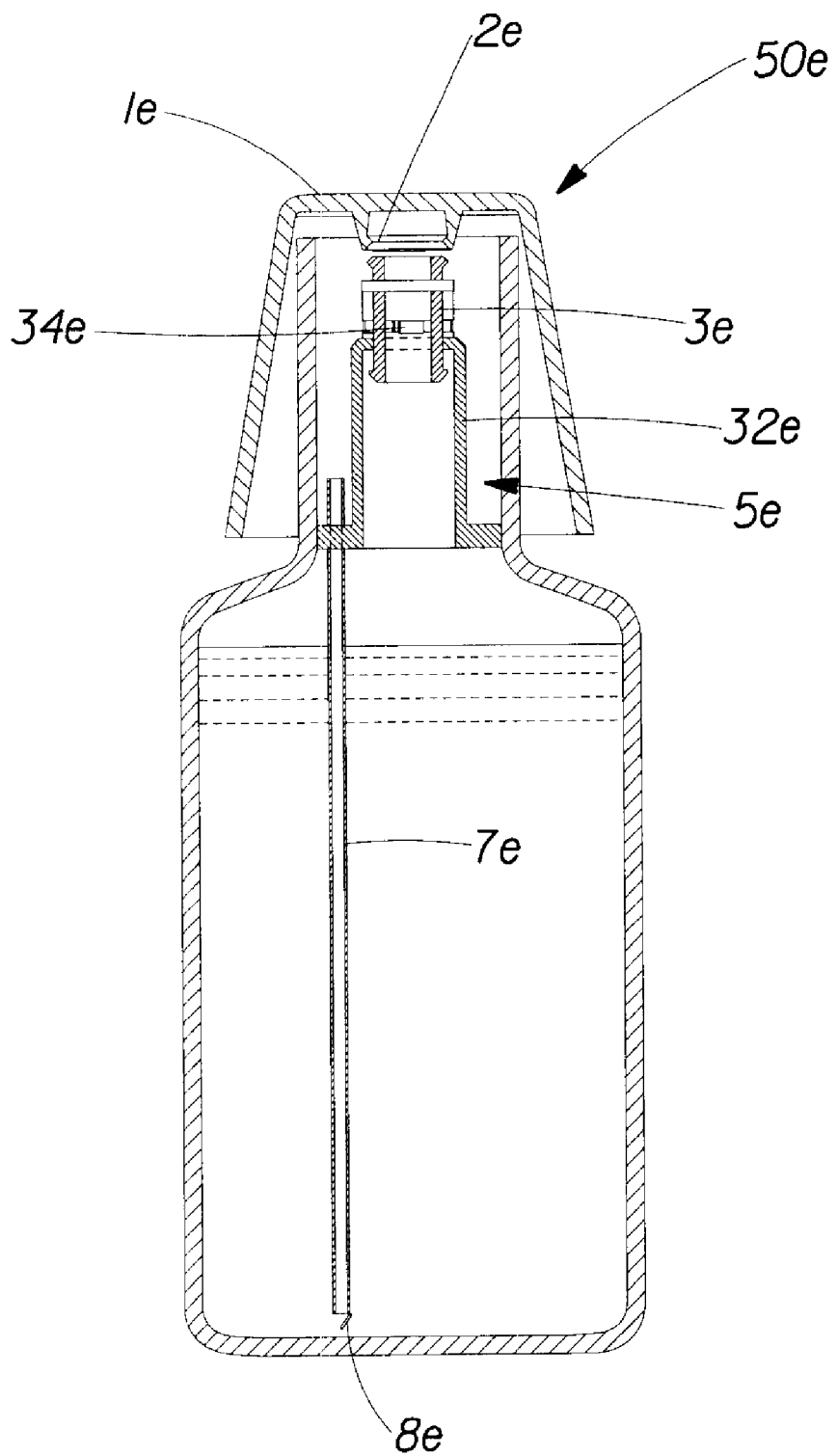
FIGS. 5A and 5B illustrate an "inverted" bottle embodiment of a metered dose dispensing package according to the present invention incorporating a sliding valve.
Figure 5B:
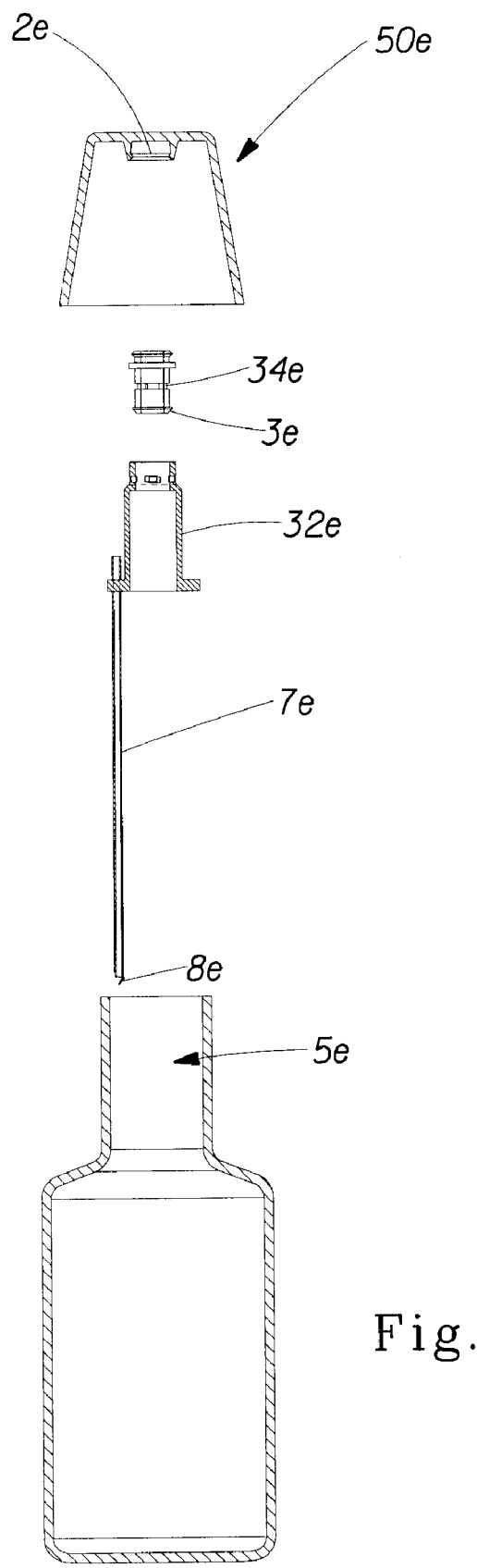

FIGS. 5A and 5B illustrate another embodiment of the present invention, incorporating a sliding valve (3e). The package (50e) has a closure (1e) having an annular ring actuator (2e) that directly interacts with sliding valve (3e). The sliding valve resides in a valve housing (32e) and can move linearly within the housing. The sliding valve also has flow channels (34e) that line up with corresponding channels in the valve housing (32e). When the container is capped, annular ring actuator (2e) is interlocked with a mating geometry on top of sliding valve (3e). This ensures relative movement between closure (1e) and sliding valve (3e). In the capped position, flow channels (34e) are open and product can flow through sliding valve (3e), when the package is placed in an inverted position. Product will flow into dose chamber (5e) until product makes contact with vent tube (7e). Upon contact with the vent tube, product ceases to flow and the unit dose is established. To dispense product, the package is turned upright and the closure is removed. During removal of the closure, annular ring actuator (2e), which is interlocked with sliding valve (3e), pulls the sliding valve upward until the extended annular ring at the bottom of the valve contacts the inner top surface of the valve housing. Once contact is made, the sliding valve stops moving upward and becomes stationary, while the closure continues rotation for removal. As the closure continues to move upward, the annular ring actuator (2c) of the closure flexes and disengages from sliding valve (3e). At this point the sliding valve has moved into a position where the flow channels between the sliding valve and the valve housing are no longer aligned, thereby making it difficult to access product. Vent tube (7e) has a check valve (8e) that prevents possible product access through the vent tube itself.

Figure 6A:
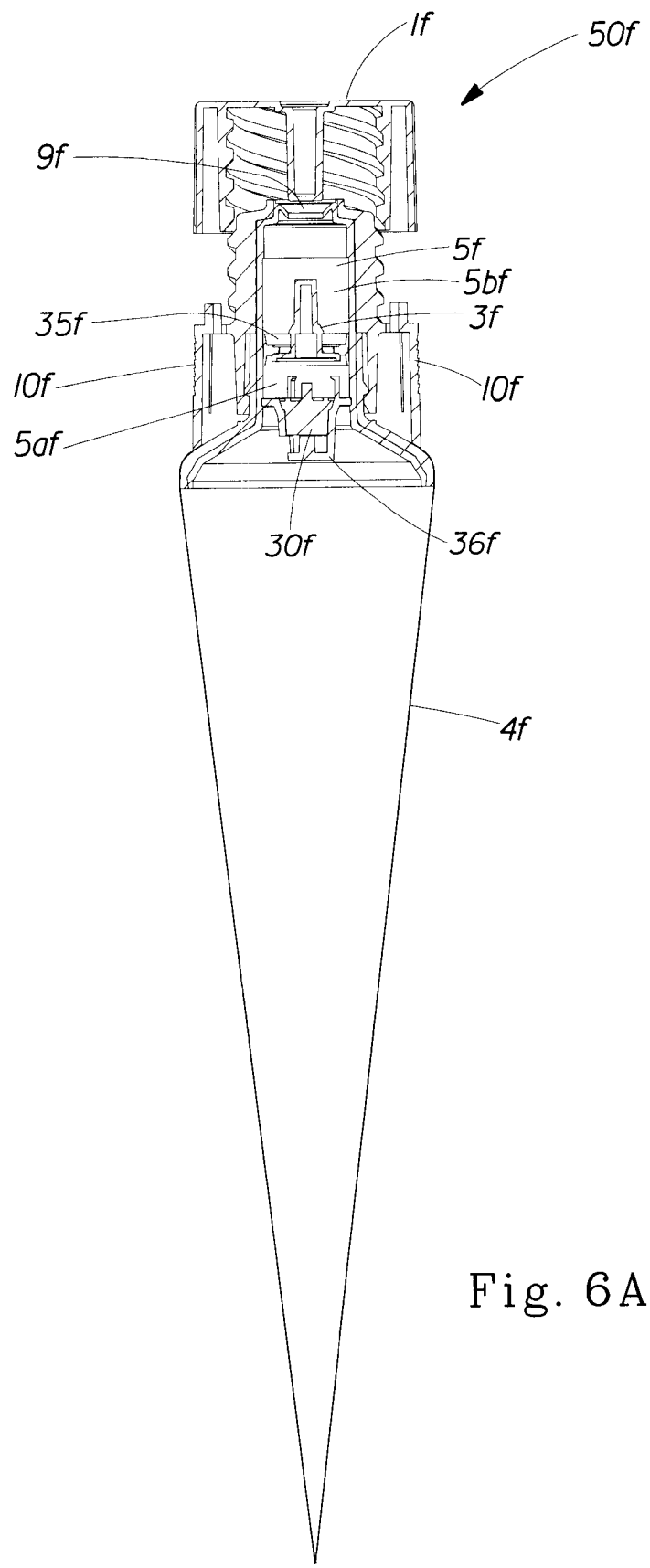
FIGS. 6A, 6B and 6C illustrate a squeeze tube according to the present invention having a child resistant closure cap and capable of metering the amount of fluid material that can be discharged from the squeeze tube after each removal of the closure cap.
Figure 6B:
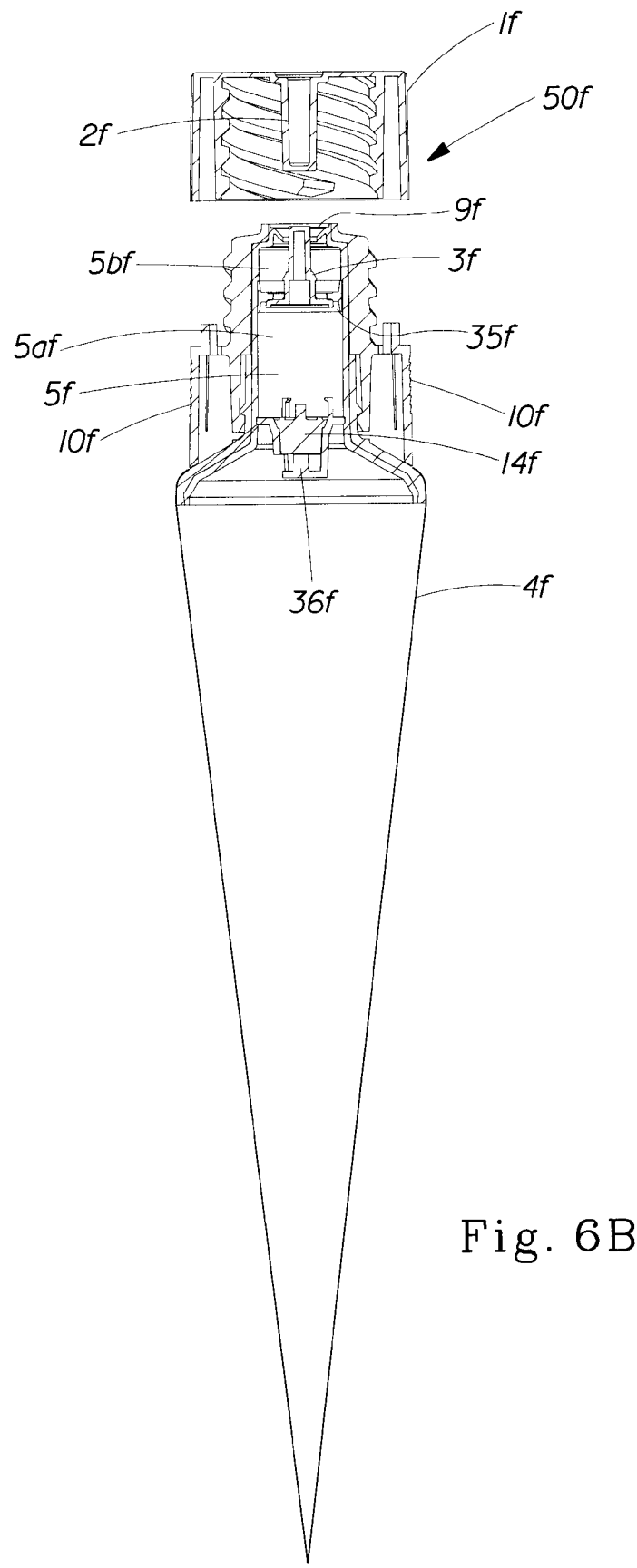
Figure 6C:
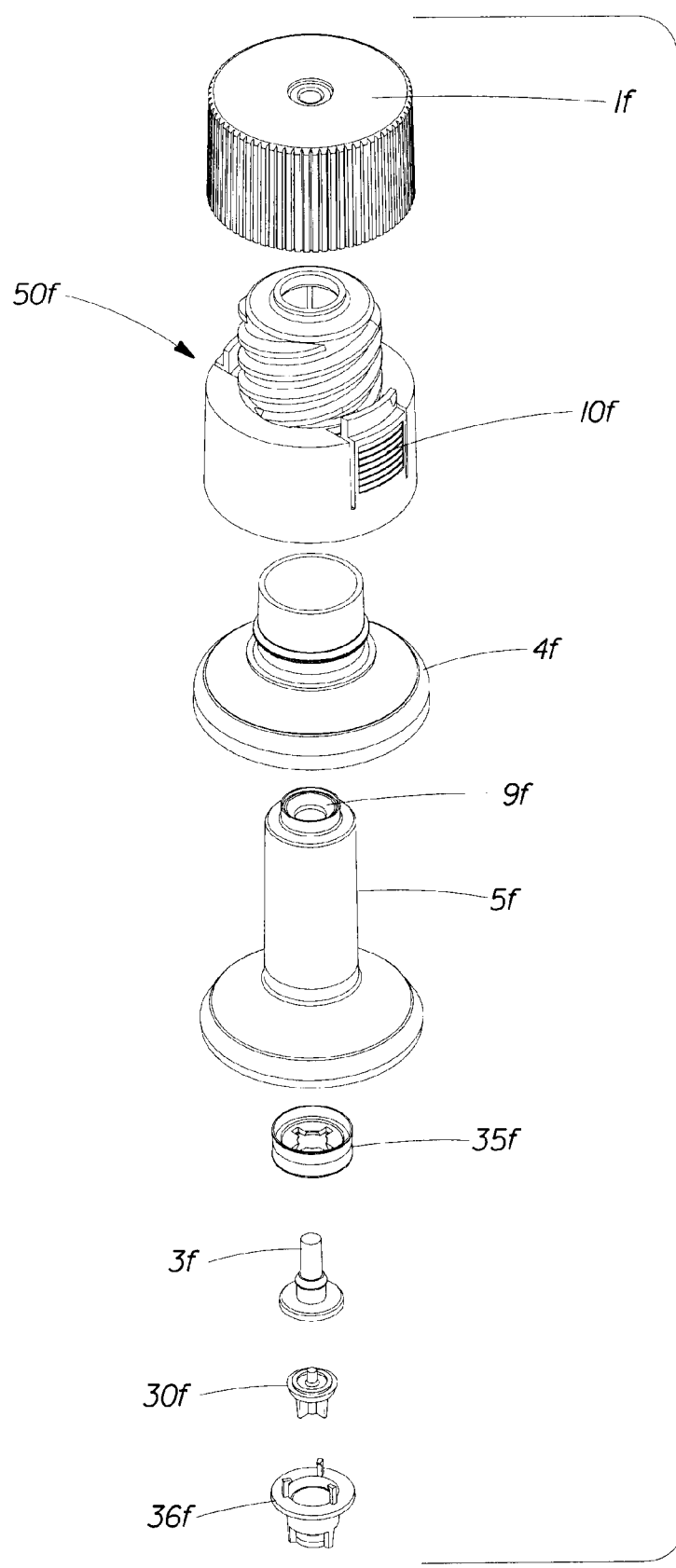

FIGS. 6A, 6B and 6C (exploded view) illustrate a squeeze tube embodiment preferably having a child resistant closure and capable of metering a predetermined amount of fluid material that can be discharged after each removal of the closure. FIG. 6A shows package (50f) with a squeezable tube body (4f), in a capped position with closure (1f). The closure has two press tabs (10f) preferably located 180° apart on the diameter of the closure. The package has a dose chamber (5f) located in the neck portion of the tube body, the dose chamber having a lower portion (5Af) positioned below a piston (35f) and an upper portion (5Bf) positioned above piston (35f), wherein the upper portion of the dose chamber is configured to hold one unit dose of product ready to be dispensed after closure (1f) is removed. The lower portion of the dose chamber is filled with product from the container through a one-way valve (30f), and product contained in the lower portion is transferred to the upper portion of the dose chamber during the re-capping process. To dispense product, press tabs (10f) on the closure are squeezed simultaneously, to allow the closure lock mechanism to disengage from the closure. With the closure removed and discharge opening (9f) exposed, the unit dose of product contained in the upper portion (5Bf) of the dose chamber can now be dispensed. Upon application of squeeze pressure on tube body (4f), product is pushed through one-way valve (30f) into the lower portion (5Af) of the dose chamber, closing a plunger valve (3f) and simultaneously forcing piston (35f) forward and filling the lower portion (5Af) of the dose chamber with product. At the end of the piston stroke, plunger valve (3f) plugs and seals discharge opening (9f). This is important to keep the discharge opening airtight. The overall dose cannot exceed the amount contained in the upper portion (5Bf) of the dose chamber. However, it is possible to dispense an amount less than the total dose contained in the upper portion of the dose chamber by simply controlling the squeeze pressure applied to the tube body.

FIG. 6B shows the dispensing system in a post-dispensed position. In order to deliver the next metered dose, closure (1f) must be placed back onto tube body (4f). As closure (1f) is being pushed or twisted back onto tube body (4f), return rod (2f) located in the center of the inside of the closure contacts plunger valve (3f) and, drives it to an open position, thereby contacting piston (35f) and pushing the piston rearward into dose chamber (5f), which forces product from the lower portion (5Af) of the dose chamber through a piston orifice into the upper portion (5Bf) of the dose chamber. As the piston moves toward the tube body (4f), one-way valve (30f) closes against a retainer ring (36f), keeping product from being forced back into the tube body. When closure (1f) is fully engaged, return rod (2f) moves into the discharge opening (9f), thereby plugging and sealing the opening previously occupied by plunger valve (3f). This creates an airtight seal that prevents product moisture from leaking out during storage. Examples of closure designs that may be used are a threaded twist design or a push-pull design. A threaded twist closure design is particularly useful for packages containing viscous products. Having closure (1f) and the neck portion of tube body (4f) in threaded engagement before contact is made between return rod (2f) and plunger valve (3f) allows mechanical advantage in the form of twisting the closure and using the threads to create a greater force for moving the piston back toward the tube body.

As an alternative to the return valve and piston assembly of the squeeze tube embodiment shown in FIGS. 6A–6C, a movable plug such as a floating ball may be used as the flow control member. The ball is sized to allow free movement within the dose chamber and to effectively plug the discharge opening. In a fully capped position, a return rod holds the ball at the bottom portion of the dose chamber. After the package is uncapped, application of squeeze pressure on the tube body pushes product through the main valve into the dose chamber, thereby pushing the ball and product present in the dose chamber toward the discharge opening. Product is dispensed until the ball reaches the discharge opening and plugs it. No additional product can be dispensed until the discharge opening is unplugged. This is accomplished by re-capping the package, whereby the return rod pushes the ball toward the bottom of the dose chamber to restage for the next dose.

Figure 7:
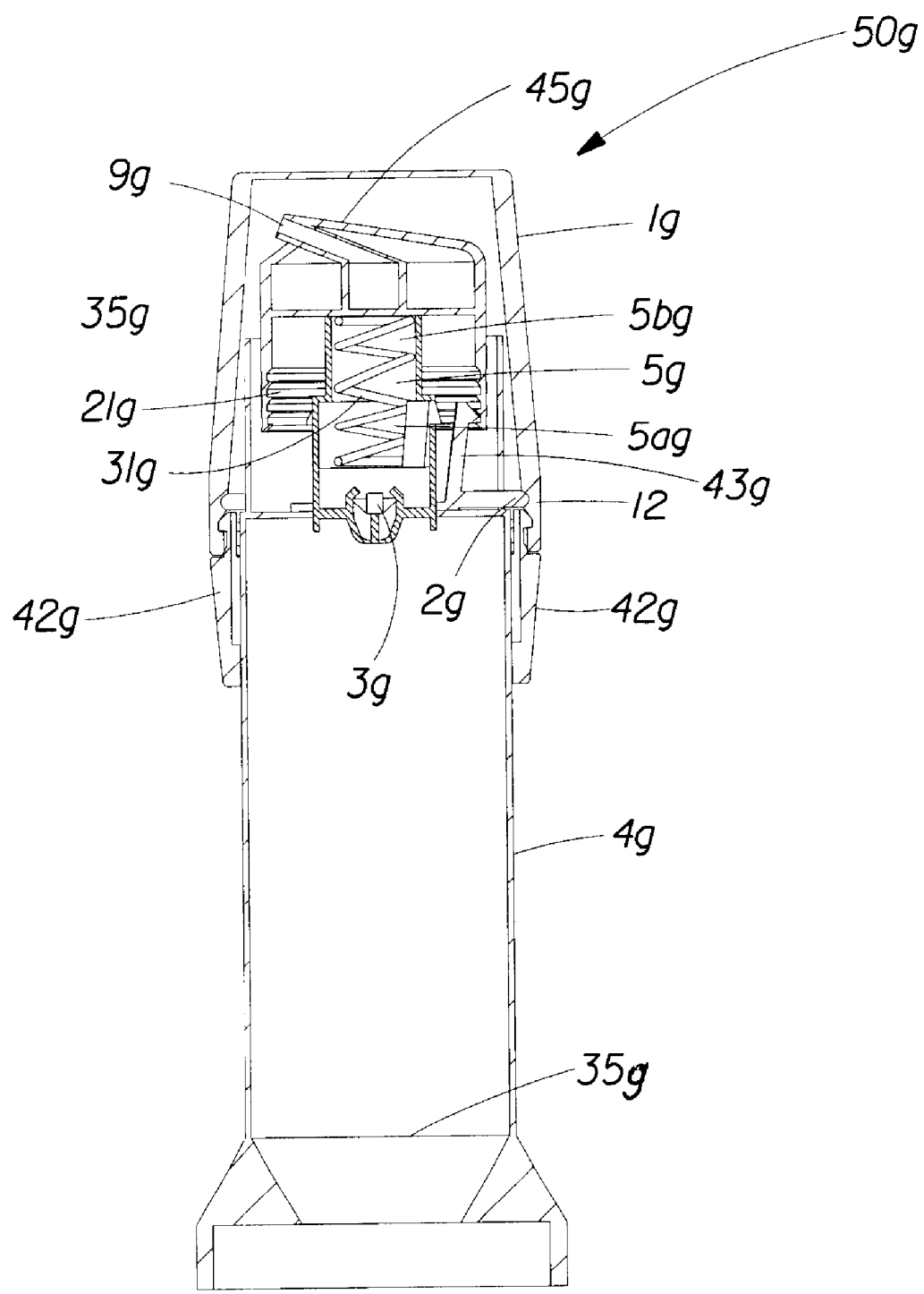
FIG. 7 shows a vacuum pump embodiment of the present unit dose dispensing system.

FIG. 7 shows a vacuum pump embodiment of the present unit dose dispensing package (50g) comprising a container body (4g) having a spring-loaded nozzle head (45g) with a discharge opening (9g), a closure (1g), a body lock mechanism comprising a pair of squeeze tabs (42g) preferably 180° apart, which tabs are configured to be squeezed simultaneously to allow the closure to disengage from the body, and a dose chamber (5g) having a lower portion (5Ag) and an upper portion (5Bg), wherein the upper portion contains a unit dose of product ready to be dispensed. The system functions as follows to deliver one unit dose of product. First, the closure is removed from the body exposing the nozzle head and discharge opening. Depressing nozzle head (45g) causes one metered dose of product to be dispensed out of the discharge opening while simultaneously closing one-way valve (3g), thus preventing product held in the container body from flowing into the dose chamber. Further pressure on the nozzle head will not dispense additional product as there is no more product in the upper portion of the dose chamber. The nozzle head is designed with annular grooves (21g) on the inner diameter that allow locking arms (43g) to keep the nozzle head in a compressed and locked position after actuation. Preferably, there are three locking arms each designed with a boss (2g) that protrudes through container body (4g) and essentially functions as the actuator. The nozzle head locks in predetermined increments, for example, 0.050 inch, when being depressed. This is important to keep the nozzle head from returning upward to a ready position prematurely. It is possible to dispense an amount less than the total dose contained in the upper portion of the dose chamber by depressing the nozzle head only partially. Molding the body in clear material and adding graduated lines to the body to show how far the follower piston (35g) has moved in the body would enable the user to measure smaller amounts than the full unit dose.

After dispensing the entire unit dose, closure (1g) must be placed back on the package to restage the dispensing system for delivering a next unit dose. Replacing the closure depresses bosses (2g) and releases locking arms (43g). The nozzle head is then returned to its home position by a spring (31g). This action pulls follower piston (35g) upward creating a vacuum that draws product through one-way valve (3g) and fills the dose chamber. The closure cap is designed with an annular groove (21g) that allows the three bosses to rest in their natural position during storage. This is important to remove pressure exerted on the locking arms during restaging and to prevent the locking arms from becoming weak due to stress. An additional level of child resistance may be incorporated in the closure, such as requiring the closure to be oriented in a specific position after disengaging the body lock mechanism.

Yet another embodiment of the present dispensing system is illustrated in FIGS. 8A–8D. The dispensing system can be used on many different packages including pumps with follower-type pistons, aerosol valves, and tubes.

Figure 8A:
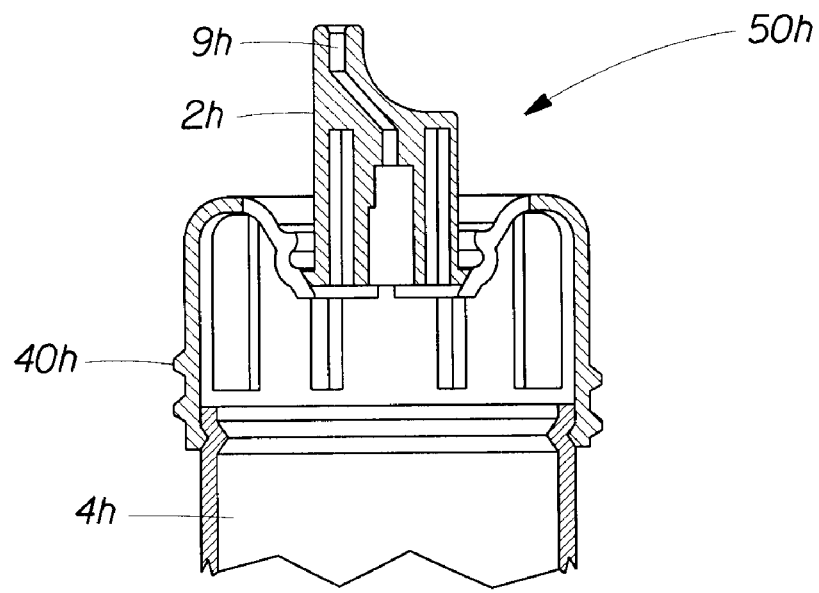
FIGS. 8A–8D illustrate an aerosol can embodiment of the present unit dose dispensing system.
Figure 8B:
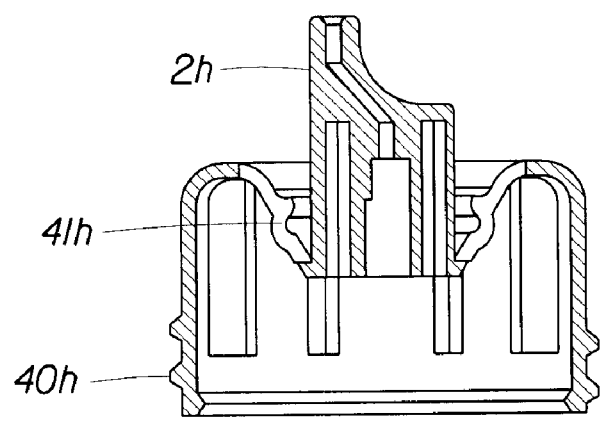

FIG. 8A shows a portion of a package (50h) with an aerosol can body (4h) having attached thereto a collar (40h) and actuator button (2h) with a discharge opening (9h), the package being in an uncapped configuration and with a metered dose ready to be dispensed. FIG. 8B shows the top portion of the package after actuator button (2h) has been depressed. This action results in dispensing a predetermined amount of product. At the end of the actuating stroke, fingers (41h) on the collar (40h) lock onto actuator (2h) prohibiting the actuator from returning to its home position. Until the actuator is returned to its home position, another dose cannot be dispensed. The actuator is returned to its home position when the closure is screwed back on the package.

Figure 8C:
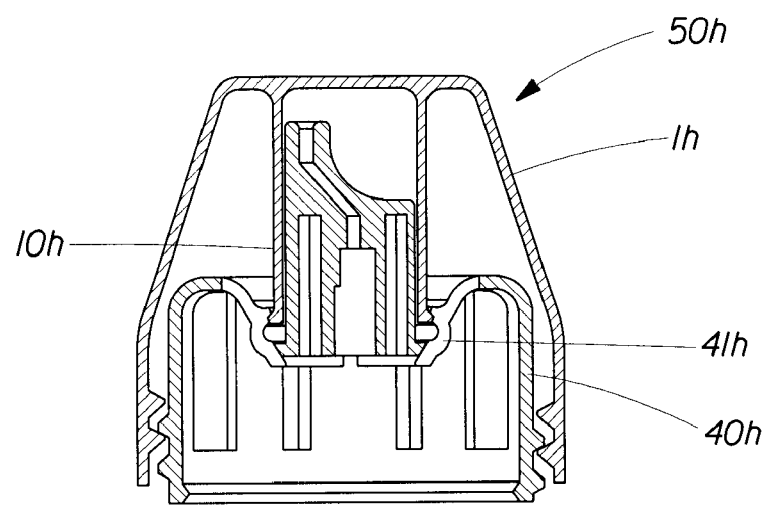

FIG. 8C shows the interaction between child resistant closure (1h) and collar (40h). While screwing the closure back on, the closure spreads out fingers (41h) on the collar long enough to allow the actuator to return to its home position. This system is timed so that the actuator is allowed to return to its home position only after child resistant tabs (10h) on closure (1h) have locked onto the collar.

Figure 8D:
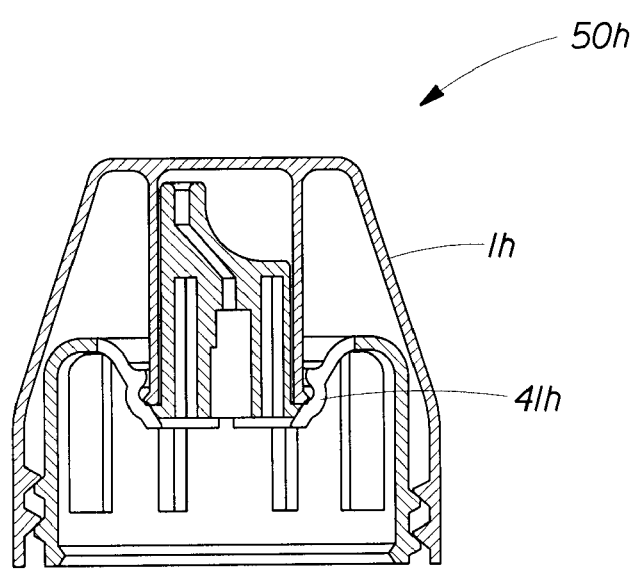

FIG. 8D shows closure (1h) fully engaged on the package. There is no longer any interaction between fingers (41h) of the collar and the closure. This allows the fingers to be relaxed and not creep out of shape. To dispense the next dose, the closure is removed and the actuator depressed to its locked position.

The present dispensing system as illustrated in the above embodiments provides controlled metered dispensing by limiting the amount of product that can be accessed to a single predetermined dose each time the container is uncapped. In addition, the present invention provides for dispensing an amount of product less than the total dose. For example, for squeezable containers that are squeezed to begin the dispensing process, the squeeze pressure applied may be decreased resulting in only a portion of the dose amount to be dispensed.

In a further embodiment of the present invention, a "variable dose" closure is used in conjunction with the controlled metered dose dispensing system. The "variable dose" feature provides a means to dial a desired dose amount from a series of predetermined doses. For example, variable doses may be different amounts of product to be dispensed for very young children under age 8, for children age 8 and to 12 and for adults age 13 or over. Or the different doses may correspond to body weight ranges of the subjects to whom the product is intended to be given. Whatever dose amount is selected, the maximum amount that may be dispensed each time the container is uncapped would still be the selected dose. Thus, if the selected dose is the amount for a child, the maximum amount dispensed would be that predetermined amount. The container will have to be recapped with the closure in order to reset the system for a user to select and dispense another dose.

Figure 9A:
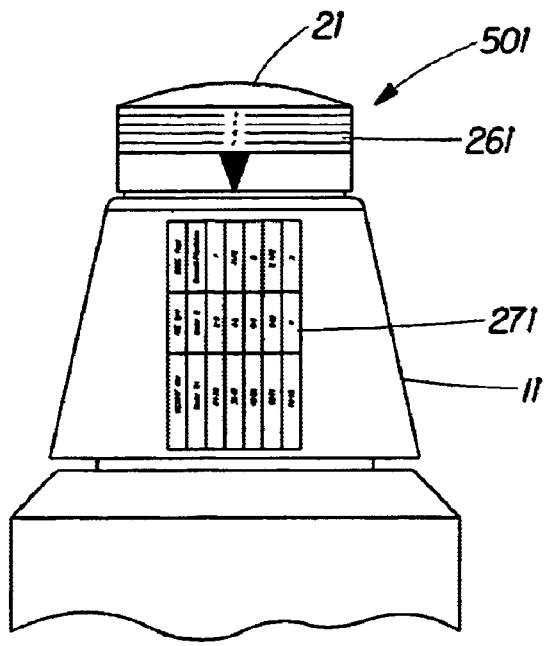
FIGS. 9A, 9B, 10A and 10B illustrate variable dose closures that may be used in conjunction with the present controlled metered dose dispensing system
Figure 9B:
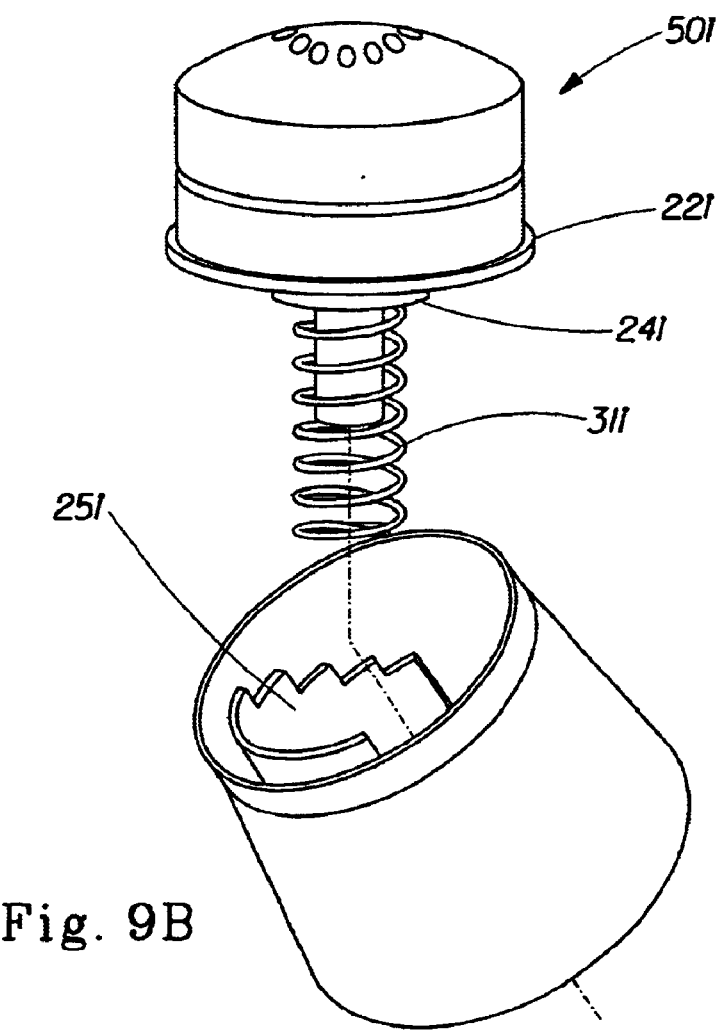

FIGS. 9A and 9B show a "twist and push" style variable dose closure. The package (50i) shown in part, has a thumbwheel return rod (2i) snapped into closure (1i) by means of a one-way snap (22i), which retains the thumbwheel onto the closure, but allows the thumbwheel to move freely. There is a coil spring (31i) located between thumbwheel return rod (2i) and closure (1i). The thumbwheel return rod is rotated to align control tab (24i) with annular stair steps (25i) in the closure, the annular stair steps marking the different depths within the closure that the thumbwheel return rod may land when depressed. The number of annular stair steps corresponds to the number of desired dose increments. The thumbwheel return rod also has indicator ribs (26i) around the outside that correspond with a dose chart (27i), providing a visual means for selecting dose amounts between the predetermined annular stair steps (25i). The coil spring (31i) positioned between the thumbwheel return rod (2i) and closure (1i) keeps the thumbwheel return rod at the highest point in the closure after staging pressure is released. This prevents premature staging when the container is recapped.

Figure 10A:
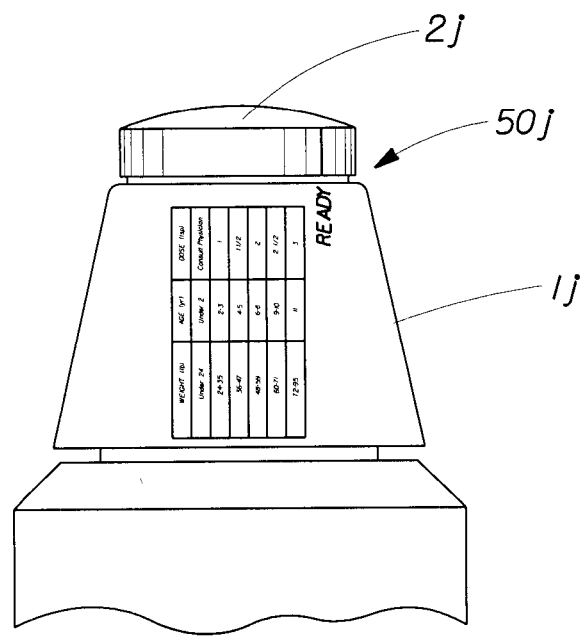
Figure 10B:
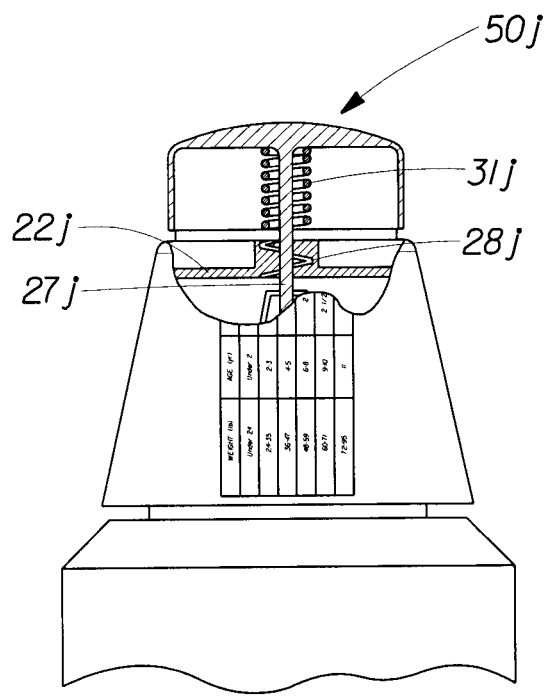

FIGS. 10A and 10B show a "twist and release" style variable dose closure. The package (50j) shown in part, has a thumbwheel return rod (2j) snapped into closure (1j) by means of a one-way snap (22j). There is a coil spring (31j) positioned between thumbwheel return rod (2j) and closure (1j). When the thumbwheel return rod is twisted clockwise it is driven down though the center of the closure by means of a helix (28j) positioned in the center of the closure and a positioning post (27j) located on the thumbwheel-return rod. As spring (31j) is compressed, energy is stored in the spring. Releasing the thumbwheel return rod allows the stored energy in the spring to force the thumbwheel return rod back up to a ready (reset) position.

The reset feature on the embodiments shown in FIGS. 9A–B and 10A–B provides a very important benefit, particularly for products that may be used by different people, each of whom may require a different dose. The consumer must dial in the dose amount each time product is dispensed. Thus, the chance of inadvertently dispensing an inappropriate dose is reduced, which may happen if the user does not have to deliberately dial in a dose and can simply dispense the previously selected dose of product.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlled dispensing of a fluid product contained in a non-collapsible package having a child resistant closure, a metered dispensing system having a dose chamber with a venting means, and a flow control member for regulating the flow of fluid product between said package and said dose chamber and including a one-way check valve that prevents the metered amount of product that has entered the dose chamber from returning back to said package, wherein only a single metered dose can be dispensed each time the package is uncapped, said method comprising the step of recapping the uncapped package and engaging said child resistant closure in order to activate said dispensing system to deliver a next dose, thereby preventing inadvertent overdosing.

2. A package having a dispensing system for controlled metered dose dispensing of a fluid product, comprising
   (a) a container having a body for holding a fluid product and a discharge opening for dispensing said fluid product, said container body being non-collapsible;
   (b) a closure fitted for capping said container and sealing said discharge opening;
   (c) a dose chamber in communication with said discharge opening, said dose chamber being capable of metering a predetermined amount of fluid product that can be dispensed from the container after each removal of said closure and having an inlet through which fluid product in said container body can flow into said dose chamber and a venting means;
   (d) a flow control member for regulating the flow of fluid product between said container body and said dose chamber and including a one-way check valve that prevents the metered amount of product that has entered the dose chamber from returning back to the container body; and
   (e) an actuator for triggering product flow from the container body into the dose chamber to provide a metered dose ready for dispensing, said actuator being associated with or cooperating with said closure, wherein the package is configured such that only a single metered dose can be dispensed each time the package is uncapped and the uncapped package must be recapped in order to activate the dispensing system to deliver additional product.

3. A package having a dispensing system for controlled metered dose dispensing of a fluid product according to claim 2, wherein said flow control member is selected from a one-way flapper valve, a one-way plunger valve, a ball valve or a sliding valve.

4. A package having a dispensing system for controlled metered dose dispensing of a fluid product according to claim 2, wherein said closure is configured with a variable dose feature for selecting a desired dose amount from a series of predetermined dose amounts.

5. A package according to claim 2 having a dispensing system for controlled metered dose dispensing of a fluid product in liquid, paste, gel or semi-solid form.

6. A package according to claim 5 for controlled metered dose dispensing of a fluid product selected from oral medicines, topical ointments and creams, eye drops, dentifrices, mouthwashes, cosmetics, detergents, cleansers, drink mixes, oils, condiments, extracts, flavorings and sauces.

* * * * *